US011553219B2

(12) United States Patent
Wang

(10) Patent No.: US 11,553,219 B2
(45) Date of Patent: Jan. 10, 2023

(54) EVENT PROGRESS DETECTION IN MEDIA ITEMS

(71) Applicant: GOOGLE LLC, Mountain View, CA (US)

(72) Inventor: Jue Wang, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/419,243

(22) PCT Filed: Aug. 5, 2019

(86) PCT No.: PCT/US2019/045155
§ 371 (c)(1),
(2) Date: Jun. 28, 2021

(87) PCT Pub. No.: WO2021/025681
PCT Pub. Date: Feb. 11, 2021

(65) Prior Publication Data
US 2022/0159319 A1 May 19, 2022

(51) Int. Cl.
*H04N 21/234* (2011.01)
*H04N 21/8547* (2011.01)
*H04N 21/84* (2011.01)
*H04N 21/81* (2011.01)
*H04N 21/235* (2011.01)
(Continued)

(52) U.S. Cl.
CPC ... *H04N 21/23418* (2013.01); *H04N 21/2187* (2013.01); *H04N 21/2353* (2013.01); *H04N 21/26603* (2013.01); *H04N 21/8133* (2013.01); *H04N 21/84* (2013.01); *H04N 21/8547* (2013.01)

(58) Field of Classification Search
CPC ......... H04N 21/23418; H04N 21/2187; H04N 21/2353; H04N 21/26603; H04N 21/8133; H04N 21/84; H04N 21/8547
See application file for complete search history.

(56) References Cited

U.S. PATENT DOCUMENTS 9,578,351 B1 * 2/2017 Bynoe ............... H04N 21/23424
10,237,512 B1 * 3/2019 Casner ................... G06V 20/42
(Continued)

OTHER PUBLICATIONS

International Search report and Written Opinion dated May 19, 2020, on application No. PCT/US2019/045155.
(Continued)

*Primary Examiner* — Fernando Alcon
(74) *Attorney, Agent, or Firm* — Lowenstein Sandler LLP

(57) ABSTRACT

One or more frames sampled from a media item of an event that is concurrently being streamed to one or more users of a content delivery platform are received. The one or more frames are analyzed to identify one or more candidate event clocks within the one or more frames. Whether a candidate event clock of the one or more candidate event clocks satisfies one or more conditions for each of the one or more frames is determined. Responsive to determining that the candidate event clock of the one or more candidate event clocks satisfies the one or more conditions, the candidate event clock is identified as an actual event clock used to time the event and mapping data that maps the actual event clock to a timestamp associated with a respective frame of the one or more frames of the media item is generated.

20 Claims, 8 Drawing Sheets

(51) Int. Cl.
  *H04N 21/266*    (2011.01)
  *H04N 21/2187*   (2011.01)

(56) References Cited

U.S. PATENT DOCUMENTS

| | | | |
|---|---|---|---|
| 10,271,111 B2* | 4/2019 | Stieglitz | G11B 27/10 |
| 2015/0312652 A1 | 10/2015 | Baker et al. | |
| 2015/0317341 A1 | 11/2015 | Barker | |
| 2016/0105734 A1* | 4/2016 | Packard | H04N 21/8549 |
| | | | 725/32 |
| 2016/0110877 A1* | 4/2016 | Schwartz | H04N 5/783 |
| | | | 382/107 |
| 2016/0234570 A1* | 8/2016 | Van Deventer | H04N 21/4622 |
| 2019/0035431 A1* | 1/2019 | Attorre | G11B 27/036 |
| 2019/0068914 A1 | 2/2019 | Casner et al. | |
| 2020/0267441 A1* | 8/2020 | Schwartz | H04N 21/44 |
| 2021/0073010 A1* | 3/2021 | Dengler | G06T 11/00 |
| 2021/0306391 A1* | 9/2021 | Rodie | H04L 65/61 |
| 2022/0070504 A1* | 3/2022 | Hartnett | H04L 12/1827 |

OTHER PUBLICATIONS

Bu, F., Sun, L.F., Ding, X.F., Miao, Y.J. and Yang, S.Q., Dec. 2008. Detect and recognize clock time in sports video. In Pacific-Rim Conference on Multimedia (pp. 306-316). Springer, Berlin, Heidelberg.

* cited by examiner

EVENT PROGRESS DETECTION IN MEDIA ITEMS

TECHNICAL FIELD

Aspects and implementations of the disclosure relate to content delivery platforms, and more specifically, but without limitation, to event progress detection in media items, such as live-stream media items.

BACKGROUND

Content delivery platforms connecting via the Internet allow users to connect to and share information with each other. Many content delivery platforms include a content sharing aspect that allows users to upload, view, and share content, such as video items, image items, audio items, and so on. Other users of the content delivery platform may comment on the shared content, discover new content, locate updates, share content, and otherwise interact with the provided content. The shared content may include content from professional content creators, e.g., movie clips, TV clips, and music video items, as well as content from amateur content creators, e.g., video blogging and short original video items.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a method comprising: receiving one or more frames sampled from a media item of an event that is concurrently being streamed to one or more users of a content delivery platform; analyzing the one or more frames to identify one or more candidate event clocks within the one or more frames; for each of the one or more frames, determining whether a candidate event clock of the one or more candidate event clocks satisfies one or more conditions; and responsive to determining that the candidate event clock of the one or more candidate event clocks satisfies the one or more conditions, identifying the candidate event clock as an actual event clock used to time the event, and generating mapping data that maps the actual event clock to a timestamp associated with a respective frame of the one or more frames of the media item.

A further aspect of the disclosure provides a system comprising: a memory; and a processing device, coupled to the memory, the processing device to perform a method according to any aspect or embodiment described herein. A further aspect of the disclosure provides a computer program product (such as a tangible computer-readable medium or a software product which can be downloaded without necessarily being stored for a non-transitory way) comprising instructions that, responsive to execution by a processing device, cause the processing device to perform operations comprising a method according to any aspect or embodiment described herein. A further aspect of the disclosure provides a computer program comprising instructions that, when executed by a processing device, cause the processing device to perform operations according to any aspect or embodiment described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding.

DETAILED DESCRIPTION

Figure 1:
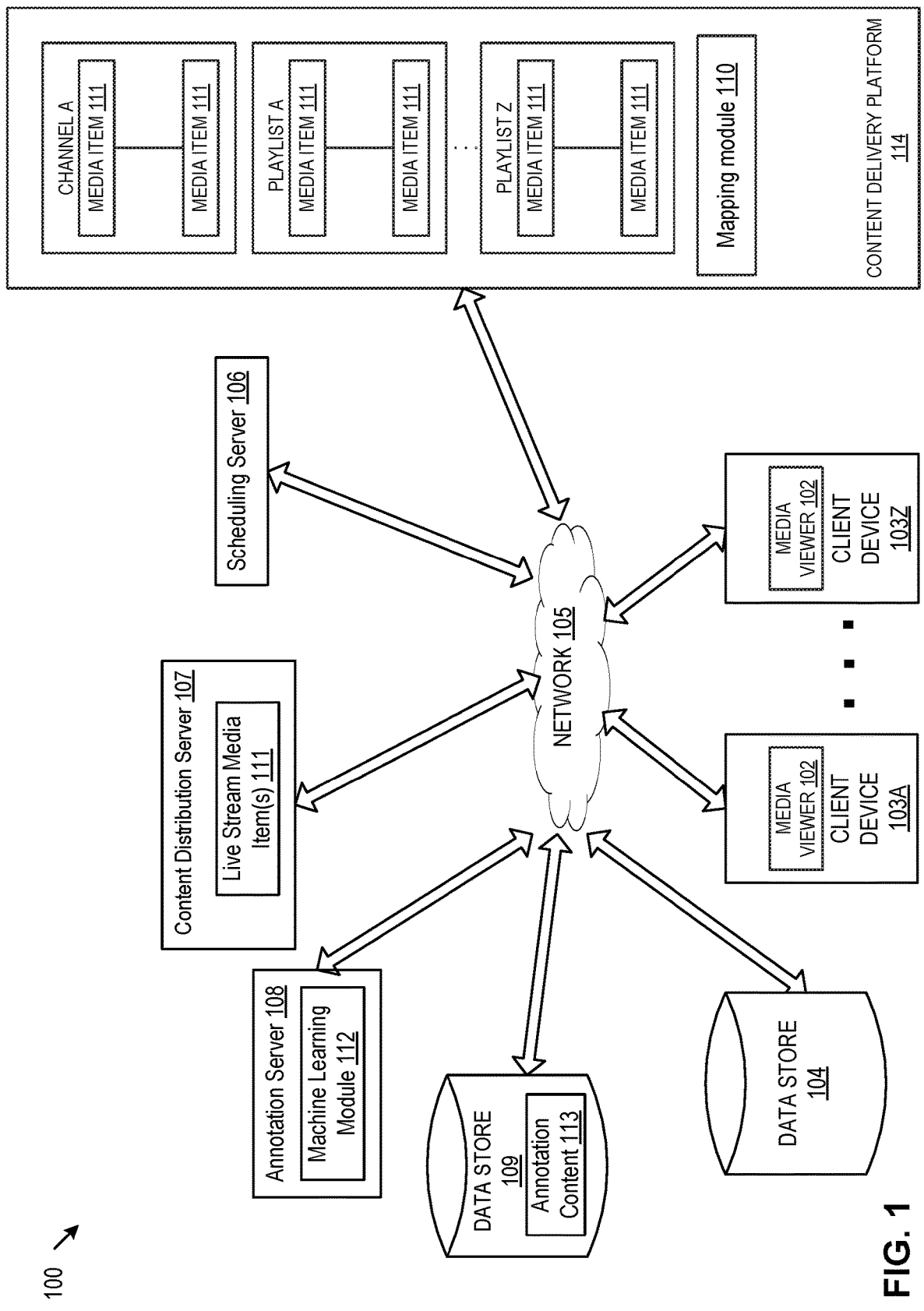
FIG. 1 illustrates an example system architecture, in accordance with embodiments of the disclosure.

A content delivery platform may offer content, such as video items, audio items, or gaming items, to users via user devices. A user may log in to a user account associated with the content delivery platform to access the content delivery platform and upload and/or consume the content. The content delivery platform can stream media items, such as live-stream video items, to one or more client devices for consumption by users. A live-stream media item may refer to a live broadcast or transmission of a live event, where the media item is concurrently transmitted, at least in part, as the event occurs, and where the media item is not available in its entirety when the transmission of the media item starts. A media item typically comprises a plurality of frames, where each frame comprises video data (and, optionally, audio data) that can be rendered at an instant in time. Each frame is associated with a timestamp. Each timestamp indexes a respective frame of the media item. For example, each timestamp may indicate a particular instant in time at which its associated frame is rendered. Timestamps may be expressed as a time (e.g., as a number of milliseconds) relative to the first frame of the media item, or relative to any other suitable datum point. Timestamps may be stored in metadata associated with their respective frames, or in any other suitable manner. The content delivery platform can receive a live-stream media item from a source entity, such as a content owner or content distributor, and buffer the media item for a short amount of time (e.g., 30 seconds) before transmitting the media item to one or more client devices (e.g., user devices of viewers). During the buffer period, the content delivery platform can add annotation content to be presented along with the media item at the client device(s). Annotation content can refer to additional content that is presented with or provided concurrently with a media item, such as a live-stream media item or pre-recorded media item. Annotation content can include, but is not limited to, videos, text, images, analysis, video overlays, and so forth. In some systems, to determine relevant annotation content for a media item, analytics, such as video analytics, can be performed on the media item to identify particular features or characteristics of the media item. Examples of such features or characteristics can include the people or things presented within the media item, the actions that the people are performing, and so forth. The particular features or characteristics can be used to generate annotation content for the media item. The analytic operation can consume a large amount of computational resources (e.g., processing and memory resources) and may be performed for multiple media items of the same event.

For example, multiple content distributors can stream different live-stream media items of the same event. Even though the live-stream media items are of the same event, the timestamps pertaining to the same scenes can be different between the live-stream media items. This typically occurs when the timestamps of different media items are expressed relative to different datum points. For instance, annotation content at a particular timestamp for live-stream media item A may not be applicable to another live-stream media item B at the same timestamp. As such, computationally intensive analytics are performed on each of the live-stream media items of the same event so that the same annotation content can be added to each of the live-stream media items at the same scene (but at different respective timestamps).

Aspects of the present disclosure address the above-mentioned and other challenges by analyzing one or more media items of the same event to identify a reference point, such as an event clock and/or event period, within frames of the media item and generating mapping data that maps a reference point, such as an event clock and/or event period, to a timestamp associated with a respective frame of the one or more media items. In some embodiments, the reference point can be used such that annotation content generated for one media item of an event can be applied to other media items of the same event without performing an analytic operation on all the media items of the same event.

In some embodiments, the reference point is a common feature that is shared by the media items. For example, an event can be a sporting event that uses an event clock and/or event period. An event clock can be used to time the event, and the event period can be used to divide the time of an event. For instance, a soccer match is divided into two periods (e.g., halves) that are 45 minutes each. The event clock of a soccer match can start at 0 and run till completion (e.g., 90 minutes) at the end of the second half. While the different live-stream media items for the soccer match can all be transmitted by different content distributors and have different timestamps for the same scenes (e.g., plays) of the soccer match, the different live-stream media items all share the same event clock and period, which can be used as a reference point.

In some embodiments, one or more frames of a media item of an event are received. The media item can be concurrently live streamed to one or more users of the content delivery platform. The one or more frames of the media item are analyzed to identify one or more candidate event clocks (or event periods) within the frames. For the one or more frames, the one or more candidate event clock (or event periods) are compared with one or more conditions (e.g., whether an aggregate score for one or more candidate event clocks within a frame exceeds a threshold, whether the candidate event clock is presented within a frame, etc.) to determine whether a candidate event clock satisfies the one or more conditions. Responsive to determining that the candidate event clock (or event period) satisfies the one or more conditions, the candidate event clock is identified as the actual event clock of the event (and/or the candidate event period is identified as the actual event period). Mapping data is generated that maps the actual event clock (e.g., the time displayed on the actual event clock) and/or event period to a timestamp associated with a respective frame of the one or more frames (e.g., the frame in which the actual event clock appears). In some embodiments, the mapping data can be generated for each of the multiple media items of the same event in similar manner.

In some embodiments, annotation content that is relevant to a media item is identified. The media item is annotated with the annotation content based on the mapping data. The media item is provided with the annotation content for presentation at the client device.

In some embodiments, the annotation content can correspond to a particular timestamp of the media item that has been analyzed to derive the annotation content. For example, the annotation content can be related to an important scene or segment of the sporting event (e.g., a scored goal). The mapping data can be used to identify a particular event clock (e.g., particular time of the event clock) and/or the event period that is associated with the timestamp of the analyzed media item. With the particular event clock and/or event period, the mapping data can further be used to identify corresponding timestamps of other media items that have the same particular event clock and/or event period. The same or similar annotation content can be applied to the other media items using the corresponding timestamps, and without the other media items being analyzed to identify the annotation content.

As noted, a technical problem addressed by embodiments of the disclosure is the large amount of computational resources used to perform an analytic operation on multiple media items of the same event. For instance, performing feature recognition on multiple media items consumes a large amount of computational resources. Additionally, since media items, such as live-stream media items are to be provided to end users with little to no latency, the analytic operation of multiple media items of the same event are often performed concurrently, which increases the computational resources required at any given time.

A technical solution to the above identified technical problem may include: receiving one or more frames sampled from a media item of an event that is concurrently being live streamed to one or more users of a content delivery platform; analyzing the one or more frames to identify one or more candidate event clocks within the one or more frames; for each of the one or more frames, determining whether a candidate event clock of the one or more candidate event clocks satisfies one or more conditions; and responsive to determining that the candidate event clock of the one or more candidate event clocks satisfies the one or more conditions, identifying the candidate event clock as an actual event clock used to time the event, and generating mapping data that maps the actual event clock to a timestamp associated with a respective frame of the one or more frames of the media item.

Thus, a technical effect of the present disclosure can include reducing the computational resources used in generating annotation content for media items of the same event and providing media items of the same event with annotation content.

As noted above, a live-stream media item may be a live broadcast or transmission of a live event. It may be further noted that "live-stream media item" or "currently presented live-stream media item" refers to a media item that is being live streamed (e.g., the media item is concurrently transmitted as the event occurs), unless otherwise noted. Subsequent to the completion of a live stream of a live-stream media item, the complete live-stream media item may be obtained and stored, and may be referred to as a "previously presented live-stream media item" or "archived live-stream media item" herein.

FIG. 1 illustrates an example system architecture 100, in accordance with one embodiment of the disclosure. The system architecture 100 (also referred to as "system" herein) includes one or more of a content delivery platform 114 (also referred to a "content distribution platform" herein), data stores 104 and 109, client devices 103A-103Z (generally referred to as "client device(s) 103" herein), annotation content generation server 108, content distribution server 107, and scheduling server 106 connected to a network 105.

In embodiments, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In embodiments, data stores 104 and 109 are persistent storages that are capable of storing content items (such as media items) as well as data structures to tag, organize, and index the content items. Data stores 104 and 109 may be hosted by one or more storage devices, such as main memory, magnetic or optical storage based disks, tapes or hard drives, network-attached storage (NAS), storage area network (SAN), and so forth. In some embodiments, data stores 104 and 109 may be a network-attached file server, while in other embodiments data stores 104 and 109 may be some other type of persistent storage such as an object-oriented database, a relational database, and so forth, that may be hosted by content delivery platform 114 or one or more different machines coupled to the content delivery platform 114 via the network 105.

In some embodiments, the client devices 103A-103Z may each include computing devices such as personal computers (PCs), laptops, mobile phones, smart phones, tablet computers, netbook computers, network-connected televisions, etc. In some embodiments, client devices 103A-103Z may also be referred to as "user devices." In embodiments, each client device includes a media viewer 102. In one embodiment, the media viewers 102 may be applications that allow users to playback, view, or upload content, such as images, video items, web pages, documents, audio items, etc. For example, the media viewer 102 may be a web browser that can access, retrieve, present, or navigate content (e.g., web pages such as Hyper Text Markup Language (HTML) pages, digital media items, etc.) served by a web server. The media viewer 102 may render, display, or present the content (e.g., a web page, a media viewer) to a user. The media viewer 102 may also include an embedded media player (e.g., a Flash® player or an HTML5 player) that is embedded in a web page (e.g., a web page that may provide information about a product sold by an online merchant). In another example, the media viewer 102 may be a standalone application (e.g., a mobile application, or native application) that allows users to playback digital media items (e.g., digital video items, digital images, electronic books, etc.). According to aspects of the disclosure, the media viewer 102 may be a content delivery platform application for users to record, edit, and/or upload content for sharing on the content delivery platform 114. As such, the media viewers 102 may be provided to the client devices 103A-103Z by content delivery platform 114. For example, the media viewers 102 may be embedded media players that are embedded in web pages provided by the content delivery platform 114. In another example, the media viewers 102 may be applications that are downloaded from content delivery platform 114.

In some embodiments, one or more of the content delivery platform 114, scheduling server 106, content distribution server 107, or annotation content generation server 108 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to media items or provide the media items to the user. For example, the content delivery platform 114 may allow a user to consume, upload, search for, approve of ("like"), disapprove of ("dislike"), or comment on media items. The content delivery platform 114 may also include a website (e.g., a webpage) or application back-end software that may be used to provide a user with access to the media items.

In embodiments of the disclosure, a "user" may be represented as a single individual. However, other embodiments of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content delivery platform 114.

In some embodiments, the content delivery platform 114 may include multiple channels (e.g., channels A through Z, of which only channel A is shown in FIG. 1). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed.

If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content delivery platform 114, feed items produced by that channel may be shown on the channel home page. Users may have a syndicated feed, which is a feed including at least a subset of the content items from all of the channels to which the user is subscribed. Syndicated feeds may also include content items from channels that the user is not subscribed. For example, the content delivery platform 114 or other social networks may insert recommended content items into the user's syndicated feed, or may insert content items associated with a related connection of the user in the syndicated feed.

Each channel may include one or more media items 111. Examples of a media item 111 can include, and are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In some embodiments, media item 111 is also referred to as content or a content item.

For brevity and simplicity, rather than limitation, a video item, audio item, or gaming item are used as an example of a media item 111 throughout this document. As used herein, "media," media item," "online media item," "digital media," "digital media item," "content," and "content item" can include an electronic file that can be executed or loaded using software, firmware or hardware configured to present the digital media item to an entity. In one embodiment, the content delivery platform 114 may store the media items 111 using the data store 104. In another embodiment, the content delivery platform 114 may store video items or fingerprints as electronic files in one or more formats using data stores 104 and 109.

In one embodiment, the media items 111 are video items. A video item is a set of sequential video frames (e.g., image frames) representing a scene in motion. For example, a series of sequential video frames may be captured continuously or later reconstructed to produce animation. Video items may be presented in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example.

In some embodiments, the media item 111 can be streamed, such as in a live stream to one or more of client devices 103A-103Z. It may be noted that "streamed" or "streaming" refers to a transmission or broadcast of content, such as a media item, where the received portions of the media item may be played back by a receiving device immediately upon receipt (within technological limitations) or while other portions of the media content are being delivered, and without the entire media item having been received by the receiving device. "Stream" may refer to content, such as a media item, that is streamed or streaming. A live-stream media item may refer to a live broadcast or transmission of a live event, where the media item is concurrently transmitted, at least in part, as the event occurs to a receiving device, and where the media item is not available in its entirety at least when the transmission of the media item starts.

In embodiments, content delivery platform 114 may allow users to create, share, view or use playlists containing media items (e.g., playlist A-Z, containing media items 111). A playlist refers to a collection of media items that are configured to play one after another in a particular order without any user interaction. In embodiments, content delivery platform 114 may maintain the playlist on behalf of a user. In embodiments, the playlist feature of the content delivery platform 114 allows users to group their favorite media items together in a single location for playback. In embodiments, content delivery platform 114 may send a media item on a playlist to client device 103 for playback or display. For example, the media viewer 102 may be used to play the media items on a playlist in the order in which the media items are listed on the playlist. In another example, a user may transition between media items on a playlist. In still another example, a user may wait for the next media item on the playlist to play or may select a particular media item in the playlist for playback.

In embodiments, the user may access content delivery platform 114 through a user account. The user may access (e.g., log in to) the user account by providing user account information (e.g., username and password) via an application on client device 103A (e.g., media viewer 102). In some embodiments, the user account may be associated with a single user. In other embodiments, the user account may be a shared account (e.g., family account shared by multiple users) (also referred to as "shared user account" herein). The shared account may have multiple user profiles, each associated with a different user. The multiple users may login to the shared account using the same account information or different account information. In some embodiments, the multiple users of the shared account may be differentiated based on the different user profiles of the shared account.

In some embodiments, content delivery platform 114 may broadcast one or more live-stream media items to client devices 103A-103Z. In some embodiments, content delivery platform 114 can receive portions of a live-stream media item, such as live-stream media item 120, as the live-stream media item is streamed from content distribution server 107. In some embodiments, the portions of a live-stream media item may correspond to a sequence of frames of the live-stream media item 120. For example, the first portion of the live-stream media item that is streamed to the content delivery platform 114 can be the first 30 seconds (seconds 0-30) of the live-stream media item, the second portion of the live-stream media item can be the second 30 seconds (seconds 31-60) of the live-stream media item, and so forth. In some embodiments, the content delivery platform 114 can buffer the portions of the live-stream media item before streaming the portions of the live-stream media item to client devices 103A-103Z. For example, content delivery platform 114 can buffer (e.g., the portions of) live-stream media item for 30 seconds after receiving the live-stream media item 120 from content distribution server 107 and before streaming the live-stream media item 120 to client devices 103A-103Z.

In some embodiments, the content delivery platform 114 can add annotation content with the presentation of the live-stream media item at the client devices 103A-103Z. In some embodiments, the content delivery platform 114 can determine one or more reference points, such as an event clock and/or event period, associated with live-stream media item that can be used as a reference to add annotation content to the presentation of the live-stream media item.

In some embodiments, the content delivery platform 114 may sample frames (e.g., video frames) of the portions of the live stream media item 120. The content delivery platform 114 can analyze the one or more sampled frames to determine one or more candidate event clocks within the sample frames of the live-stream media item 120. For each of the sampled frames, the content delivery platform 114 can determine whether any of the one or more candidate event clocks satisfy one or more conditions. Responsive to determining that a candidate event clock satisfies the one or more conditions, content delivery platform 114 can identify that the candidate event clock is the actual event clock used to time the event. Content delivery platform 114 can map the actual event clock to a timestamp associated with a respective frame in which the actual event clock is presented. In some embodiments, the content delivery platform 114 can determine an actual event period within some or all the sampled frames of the live-stream media item 120 in a similar manner as described above. The actual event clock and actual event period can be mapped to the timestamp associated with a respective frame in which the actual event clock and/or the actual event period are presented. Identifying the actual event clock is further described with respect to FIG. 3A and identifying the actual event period is further described with respect to FIG. 3B.

In some embodiments, system architecture 100 includes a scheduling server 106. Scheduling server 106 can provide information, such as scheduling information, regarding transmission or broadcasts of media items, such as live-stream media items. The scheduling information can include information such as the event type of the live-stream media item, the start time of the transmission or broadcast of the media item, the end time of the transmission or broadcast of the media item, the title of the media item, and/or other metadata associated with the media item. In some embodiments, the scheduling information can indicate the particular content distributor that is to transmit or broadcast the live-stream media item. For example, the scheduling information can indicate that the content distributor of content distribution server 107 is to transmit live-stream media item 120 at 4:00 PM Pacific Standard Time on July 18. The scheduling information can also indicate that the live-stream transmission is of a basketball sports event between the Santa Clara Broncos and the Colorado Tigers. In some embodiments, the scheduling server 106 is a third-party service provider. In some embodiments, scheduling server 106 can be part of content delivery platform 114 or content distribution server 107.

In some embodiments, content delivery platform 114 (e.g., mapping module 110) can query the scheduling server 106 to retrieve scheduling information corresponding to the broadcast or transmission of media items, such as live-stream media items. In some embodiments, content delivery platform 114 can communicate with the scheduling server 106 via network 105 to determine any live-stream media items that are to be broadcast in the future and the event type of live-stream media items. In some embodiments, content delivery platform 114 can select live-stream media items of particular event types of interest, such as sporting events or any events that use an event clock, for example.

In some embodiments, system architecture 100 includes one or more content distribution servers, such as content distribution server 107. Content distribution server 107 can be part of a content distributor that broadcasts or transmits media items, such as live-stream media item. In some embodiments, content distribution server 107 can transmit one or more live-stream media items to content delivery platform 114. Content delivery platform 114 can annotate the live-stream media item with annotation content, and transmit the annotated live-stream media item to one or more client device 103A-103Z. In some embodiments, the content distribution server 107 is part of content delivery platform 114. In other embodiments, the content distribution server 107 is a third-party platform that distributes content to content delivery platform 114.

In some embodiments, system architecture 100 includes an annotation content generation server 108. In some embodiments, the annotation content generation server 108 can provide an annotation service that identifies or generates annotation content that is provided to content delivery platform 114 for inclusion with the presentation of the live-stream media item.

In some embodiments, annotation content generation server 108 can analyze a live-stream media item (e.g., portions of the live-stream media item) to identify content of interest within or associated with the live-stream media item. In some embodiments, annotation content generation server 108 can use a machine learning model 112 to identify content of interest within or associated with the live-stream media item. For example, content delivery platform 114 can send portions of the live-stream media item to the annotation content generation server 108. The annotation content generation server 108 can use the portion of the live-stream media item as input (e.g., features) for the machine learning model 112 (before any preprocessing or after preprocessing the portions of the live-stream media item) and receive an output of the machine learning model 112 that gives a probability that a particular range of timestamps of the live-stream media item contains some content of interest. In some embodiments, the annotation server can generate particular annotation content for the live-stream media item based on the output of the machine learning model 112. The machine learning model 112 may be trained using training data (e.g., exemplary media items, such as live-stream media item can be used as training inputs and content of interest within the media items, such as short segments within the media item can be used as target outputs).

For example, the annotation content generation server 108 can identify a relevant segment (e.g., important play or key play) of the basketball game at the range of timestamps 1 minute 30 seconds to 2 minutes with respect to the live-stream media item. The annotation content generation server 108 can further generate annotation content that includes a highlight clip (e.g., short video) that shows video of the relevant segment along with some information regarding the relevant segment, such as the player involved, the range of timestamps when the important play takes place with respect to the live-stream media item, the game score at the time the important play occurs, and so forth. The generated annotation can be provided to content delivery platform 114 for inclusion in the presentation of the live-stream media item.

In some embodiments, annotation content generation server 108 can provide annotation information to content delivery platform 114, where the annotation information is used by content delivery platform 114 to generate the annotation content.

For example, annotation content generation server 108 can send to the content delivery platform 114 annotation information, such as the range of timestamps when the important play takes place with respect to the live-stream media item. The content delivery platform 114 can generate a highlight clip of the important play based on the range of timestamps with respect to the live-stream media item.

In some embodiments, the annotation content generation server 108 can be part of content delivery platform 114. In some embodiments, annotation content generation server 108 can be provided by a third-party service that communicates with the content delivery platform 114 via an application programming interface (API). The annotation content generated by annotation content generation server 108 is further described with respect to FIG. 2A and FIG. 3A.

In some embodiments, system architecture 100 includes data store 109. In some embodiments, the data store 109 can store relevant content pertaining to the live-stream media item. For example, relevant content can include event information that can be used to generate annotation content for inclusion with the presentation of the live-stream media item. In some embodiments, annotation content generation server 108 or content delivery platform 114 can use data store 109 to generate annotation content for a live-stream media item. For example, data store 109 can include event information 113 pertaining to the particular event that is being streamed as live-stream media item. For instance, the event information can include live statistical information about the event, statistical information or other information regarding the participants of the event, players of the event, scoring information about the event, team information about team(s) participating in the event, historical information pertaining to the event, participants, or teams, or any other type of event-related information. The data store 109 can be queried to retrieve the event information. In some embodiments, the information of the data store 109 can be obtained based on the actual event clock (and/or actual event period) of the event.

In some embodiments, one or more of the operation described herein can be performed by a mapping module 110 that is part of content delivery platform 114. In some embodiments, the mapping module 110 can be part of another component of FIG. 1. For example, the mapping module 110 can be hosted by an external service, such as a third-party service.

Figure 2A:
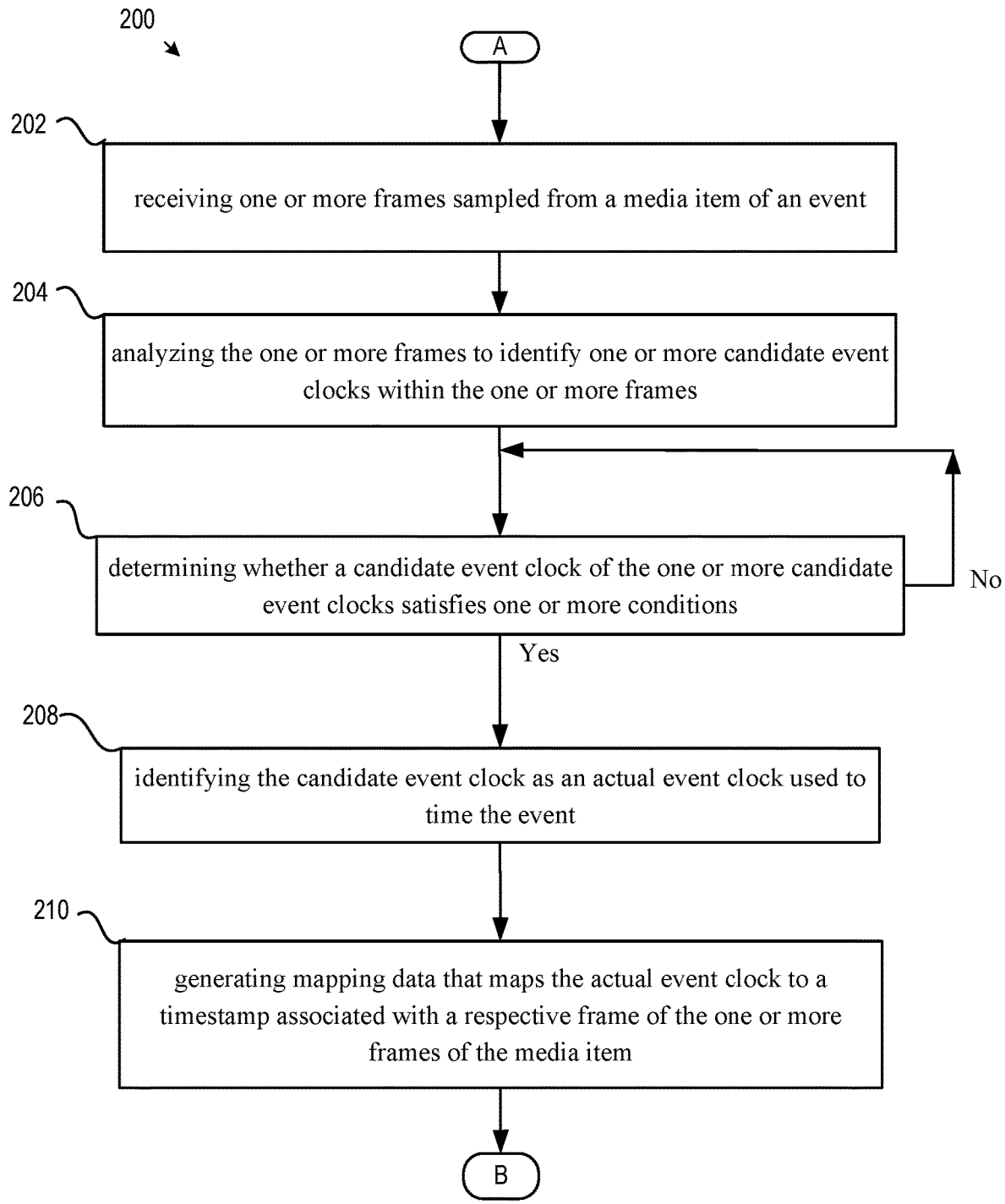
FIG. 2A illustrates a flow diagram of a method for identifying the candidate event clock as an actual event clock and mapping the actual event clock to a timestamp associated with a respective frame of the media item, in accordance with embodiments of the disclosure.

FIG. 2A illustrates a flow diagram of a method 200 for identifying the candidate event clock as an actual event clock and mapping the actual event clock to a timestamp associated with a respective frame of the media item, in accordance with embodiments of the disclosure. Method 200 is performed by processing logic that may include hardware (circuitry, dedicated logic, etc.), software (e.g., instructions run on a processing device), or a combination thereof. In some embodiments, some or all the operations of method 200 may be performed by one or more components of system 100 of FIG. 1. In some embodiments, one or more operations of method 200 may be performed by a mapping module 110 of content delivery platform 114 as described with respect to FIG. 1. It may be noted that components described with respect FIG. 1 may be used to illustrate aspects of FIG. 2A.

At block 202 processing logic implementing method 200, receives one or more frames sampled from a media item, such as a live-stream media item, of an event. In some embodiments, the event is concurrently being live streamed to one or more users of the content delivery platform 114. For example, the one or more frames can be from a portion of the media item received at content delivery platform 114, where other portions of the media item have not yet been recorded (as the event has not yet completed) or transmitted to content delivery platform 114.

At block 204, processing logic analyzes the one or more frames to identify one or more candidate event clocks within the one or more frames. The term "candidate event clock" refers to a portion of the frame that may, or may not, be the actual event clock. For example, a candidate event clock can include text (e.g., numbers) that is visibly displayed in a frame. A candidate event clock may be analyzed to determine whether it is the actual event clock that is used to time the event. In some embodiments, analyzing the one or more frames to identify the one or more candidate event clocks within the one or more frames includes performing an optical character recognition operation on the one or more frames to identify text indicative of the one or more candidate event clocks and location information that describes locations of the one or more candidate event clocks with respect to the one or more frames. Some aspects of analyzing the one or more frames to identify one or more candidate event clocks within the one or more frames are further described with respect to FIG. 3A.

At block 206, processing logic determines whether a candidate event clock of the one or more candidate event clocks satisfies one or more conditions. In embodiments, the determining whether a candidate event clock of the one or more candidate event clocks satisfies one or more conditions can be performed for each of the one or more frames. Some aspects of determining whether a candidate event clock satisfies one or more conditions will be further described with respect to FIGS. 2B-3A. For each frame where processing logic determines a candidate event clock that satisfies the one or more conditions, processing logic can proceed to block 208. If processing logic does not determine that a candidate event clock for any of the one or more frames satisfies the one or more conditions, processing logic can return to block 202 to perform the operations of method 200 on additional sampled frames of other (e.g., more recently received) portions of the media item.

At block 208, processing logic identifies the candidate event clock as an actual event clock used to time the event. In some embodiments, candidate event clock is identified as an actual event clock in each of the one or more frames for which a candidate event clock is determined to satisfy the one or more conditions.

At block 210, processing logic generates mapping data that maps the actual event clock to a timestamp associated with a respective frame of the one or more frames of the media item. In some embodiments, generating mapping data that maps the actual event clock to a timestamp associated with a respective frame of the one or more frames of the media item is responsive to determining that the candidate event clock of the one or more candidate event clocks satisfies the one or more conditions. In some embodiments, generating mapping data that maps the actual event clock to a timestamp associated with a respective frame of the one or more frames of the media item is performed for each of the one or more frames within which an actual event clock is identified. Some aspects of generating mapping data are further described with respect to FIGS. 3A-3B.

In some embodiments, processing logic can identify annotation content that is relevant to the media item. In some embodiments, processing logic can annotate the media item with the annotation content based on the mapping data. For example, when given annotation content that is to be rendered at a particular time that is defined with reference to the actual event clock, the processing logic can use the mapping data to identify a timestamp corresponding to that particular time. The processing logic can then annotate the media item by associating the annotation content with a frame having the identified timestamp. For example, the processing logic can annotate the media item by adding the annotation content to the metadata of that frame. In some embodiments, processing logic can provide the media item with the annotation content for presentation at the client device.

In some embodiments, processing logic can analyze the one or more frames to identify one or more candidate event periods within the one or more frames. The term "candidate event period" refers to a portion of the frame that may, or may not, represent the actual event period. For example, a candidate event clock can include text (e.g., one or more letters and/or numbers) that is visibly displayed in a frame. A candidate event period may be analyzed to determine whether it is the actual event period used to divide a time of the event. In some embodiments, analyzing the one or more frames to identify one or more candidate event periods within the one or more frames includes performing an optical character recognition operation on the one or more frames to identify text indicative of the one or more candidate event periods and location information that describes locations of the one or more candidate event periods with respect to the one or more frames.

In some embodiments, processing logic can determine whether a candidate event period of the one or more candidate event periods satisfies one or more conditions. In some embodiments, determining whether a candidate event period of the one or more candidate event periods satisfies one or more conditions can be performed for each of the one or more frames or some of the one or more frames.

In some embodiments, responsive to determining that the candidate event period of the one or more candidate event periods satisfies the one or more conditions, processing logic identifies the candidate event period as an actual event period used to divide a time of the event. In some embodiments, processing logic generates mapping data that maps the actual event period to a timestamp associated with a respective frame of the one or more frames of the media item. In some embodiments, generating mapping data that maps the actual event period to a timestamp associated with a respective frame of the one or more frames of the media item is performed responsive to determining that the candidate event period of the one or more candidate event periods satisfies the one or more conditions. Some aspects of identifying a candidate event period as an actual event period are further described with respect to FIG. 3B.

In some embodiments, processing logic can cause an annotation content analysis of the media item as the media item is concurrently being streamed to the one or more users. In some embodiments, the annotation content analysis is performed to identify annotation content that is relevant to the media item at a particular timestamp(s) associated with the media item. In some embodiments, processing logic provides the annotation content to a client device for presentation with an instance of the media item. Some aspects of causing annotation content analysis of the media item are further described with respect to FIG. 3A.

In some embodiments, the media item is a first media item and the client device is a first client device. In some embodiments, processing logic generates additional mapping data that maps the actual event clock to a timestamp associated with a respective frame of one or more frames of a second media item. Generating mapping data for the second media item can be performed in similar manner as described herein with respect to generating mapping data for the media item (e.g., first media item). In some embodiments, processing logic annotates the second media item with the annotation content based on the actual event clock and the additional mapping data. In some embodiments, processing logic provides the second media item with the annotation content for presentation at a second client device.

In some embodiments, an annotation content analysis of the second media item is not performed. For example, processing logic may determine not to perform an annotation content analysis of the second media item, and consequently omit performing such annotation content analysis. In some embodiments, the timestamp associated with the first media item and that corresponds to a particular time of the actual event clock of the event is different than a timestamp associated with the second media item and that corresponds to the same particular time of the actual event clock of the event.

Figure 2B:
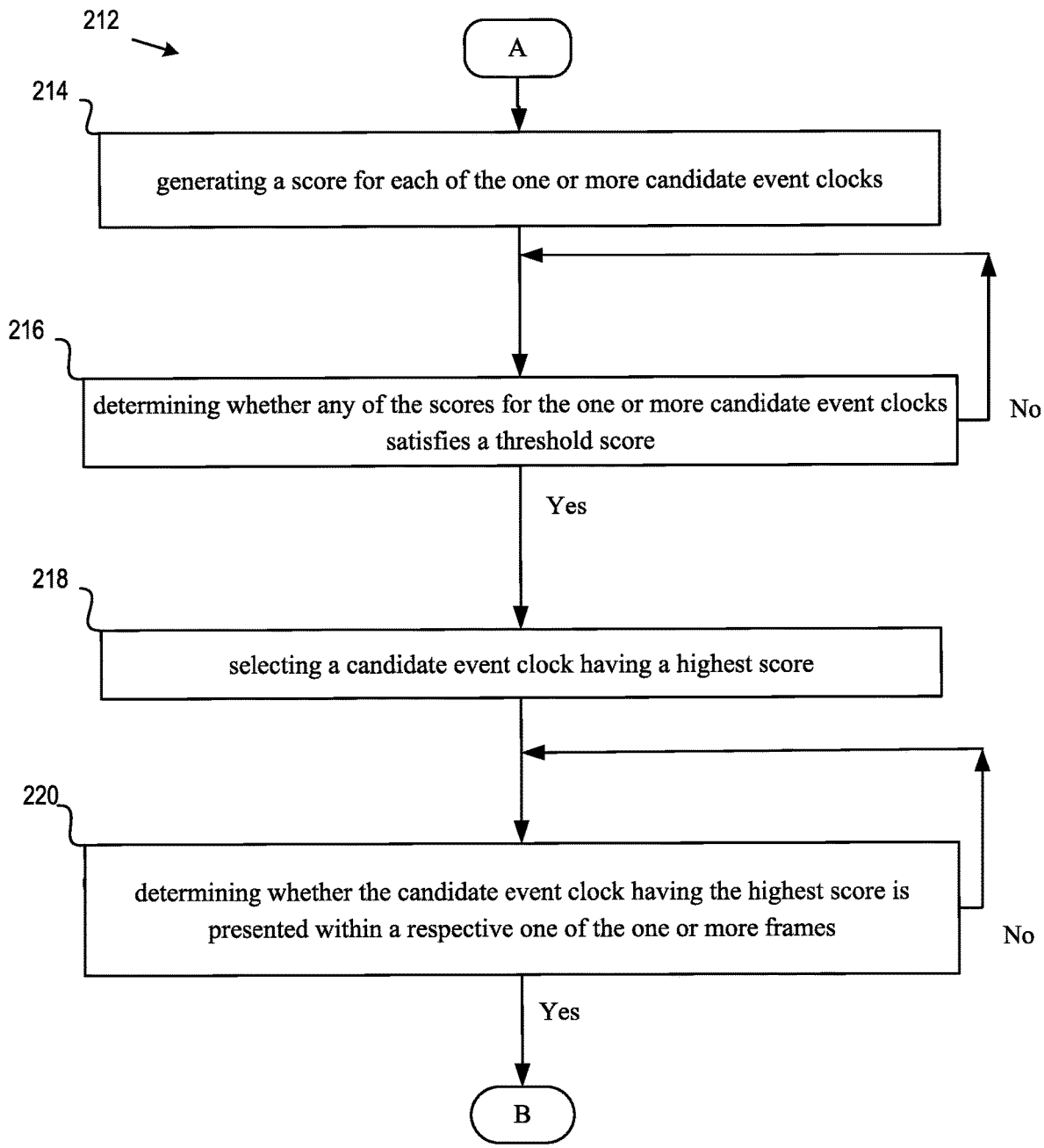
FIG. 2B illustrates a flow diagram of a method for determining whether a candidate event clock satisfies one or more conditions, in accordance with embodiments of the disclosure.

FIG. 2B illustrates a flow diagram of a method 212 for determining whether a candidate event clock satisfies one or more conditions, in accordance with embodiments of the disclosure. The method 212 is performed by processing logic that may include hardware (circuitry, dedicated logic, etc.), software (e.g., instructions run on a processing device), or a combination thereof. In some embodiments, some or all the operations of method 212 may be performed by one or more components of system 100 of FIG. 1. In some embodiments, one or more operations of method 212 may be performed by mapping module 110 of content delivery platform 114 as described with respect to FIG. 1. It may be noted that components described with respect FIG. 1 may be used to illustrate aspects of FIG. 2B. It can be noted that one or more of the conditions described with respect to method 212 can be implemented alone or with one or more other conditions to determine whether the candidate event clock satisfies the determined conditions(s). It can further be noted that the operations of method 212 can be performed on one or more frames of the media item. Method 212 will be described as being performed for a single frame, for purposes of illustration rather than limitation.

At block 214, processing logic implementing method 212 generates a score for each of the one or more candidate event clocks for a frame of the media item. In some embodiments, the score can indicate a likelihood that a respective candidate event clock of the one or more candidate event clocks is the actual event clock used to time the event. In some embodiment, each frame can have two scores, a frame score and an aggregate score. The frame score can refer to the score of a candidate event clock determined for the specific frame. The aggregate score can refer to an aggregate or cumulative score of previous frame scores for the candidate event clock and the current frame score for the candidate event clock. Frame score and aggregate score is further described with respect to FIG. 4. Score as used herein refers to an aggregate score, unless otherwise described or implied.

At block 216, processing logic determines whether a first condition is satisfied by determining whether any of the scores for the one or more candidate event clocks (of a frame) satisfy a threshold score. For example, satisfying a threshold score can include determining that the candidate event clock score (e.g., aggregate score) is greater than or equal to the threshold score. In some embodiments, if the candidate event clock score does satisfy a threshold score, processing logic can proceed to block 218 to determine whether the candidate event clock satisfies a second condition, such as determining which of the candidate event clocks that satisfied the threshold score has the highest score. In some embodiments, if the candidate event clock score does not satisfy a threshold score, processing logic can repeat operations performed at block 214 for the next successive frame of the one or more frames or for frames for additional portions of the media item.

At block 218, processing logic determines whether a second condition is satisfied by selecting the candidate event clock having the highest score. It can be noted that multiple candidate event clocks in a frame can have scores that satisfy the threshold score in some instances. In some embodiments, selecting the candidate event clock having the highest score is responsive to determining that more than one of the scores for the one or more candidate event clocks satisfies the threshold score.

At block 220, processing logic determines whether a third condition is satisfied by determining whether the selected candidate event clock is presented within the frame. In some embodiments, if the candidate event clock is presented within the frame, processing logic can determine that the candidate event clock is the actual event clock. It can be noted that in some embodiments a frame that does not have a candidate event clock may not have a frame score for the frame, but still can have an aggregate score for the candidate event clock for the frame. In some embodiments, if the candidate event clock is not presented within the frame, processing logic returns to block 214 to process a next frame. Some aspects of determining whether the candidate event clock satisfies one or more conditions are further described with respect to FIG. 4.

It can also be noted that determining whether a candidate event period satisfies one or more conditions can be performed in a similar manner as described to method 212.

Figure 3A:
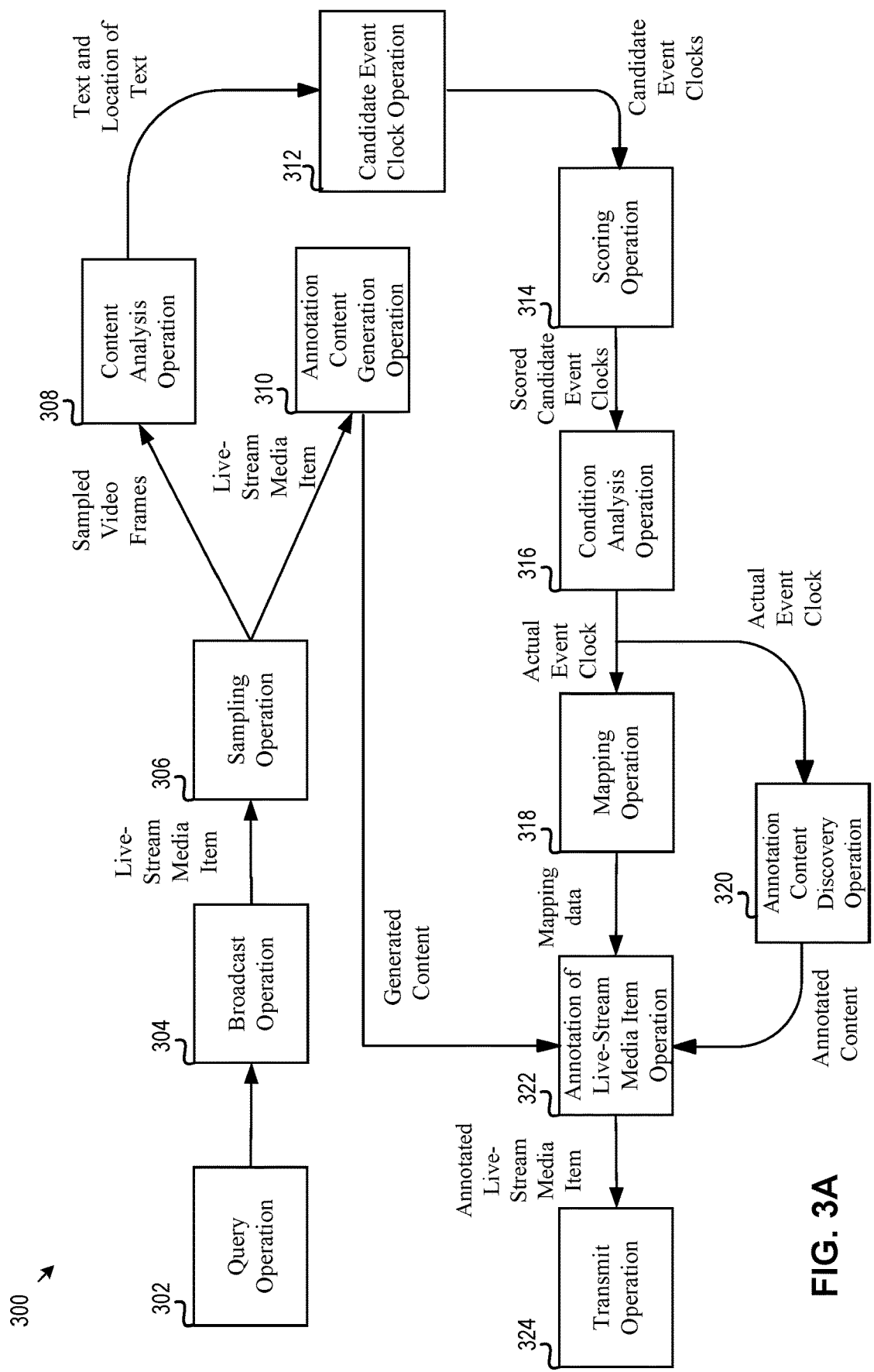
FIG. 3A is an example pipeline of operations for mapping an actual event clock to a timestamp associated with a frame of the live-stream media item, in accordance with embodiments of the disclosure.

FIG. 3A is an example pipeline of operations for mapping an actual event clock to a timestamp associated with a frame of the media item and providing annotation content with the live-stream media item for presentation at the client device, in accordance with embodiments of the disclosure. One or more of the operations of pipeline 300 can be performed by mapping module 110. Although the pipeline 300 is illustrated with a particular order, it can be appreciated that some of the operations can performed serially or in parallel. It can also be noted that the same, fewer, greater, or different operations can be performed in some embodiments.

In some embodiments, at query operation 302 content delivery platform 114 (e.g., mapping module 110) can query the scheduling server 106 of FIG. 1 to identify any live-stream media items that are to be transmitted or broadcast in the future (or presently being broadcast or transmitted). The content delivery platform 114 can also determine from querying the scheduling server 106 the event type of the live-stream media item. Content delivery platform 114 can determine whether the event type of the live-stream media items is an event type of interest, by comparing the event type to a record of event types of interest. Event types can include, for example, different types of sporting events or event types that have event clocks. In some embodiments, if the live-stream media item that is scheduled for transmission is of an event type of interest, content delivery platform 114 can schedule a job to generate mapping data for the live-stream media item once transmission of the live-stream media item has begun.

In some embodiments, at the broadcast operation 304, the content distribution server 107, as described in detail in FIG. 1, can transmit (e.g., stream) the live-stream media item to content delivery platform 114. As noted above, portions of the live-stream media item can be streamed to content delivery platform 114. Content delivery platform 114 can buffer the portions of the live-stream media item and perform operations (e.g., mapping and annotation of live-stream media item, etc.) described herein.

It can be noted that an event can be streamed as multiple media items, such as multiple live-stream media items. The multiple live-stream media items can be different than multiple instances of the same live-stream media item. For example, the multiple live-stream media items of the event can be recorded from different cameras, transmitted by different content distributors, or created for different regional markets. The multiple live-stream media items of the same event can have different timestamps that correspond to the same actual event clock or actual event period of the event. For example, a sporting event is taking place in Spain. A live-stream of the sporting event broadcast in the United States can be different from a live-stream of the same sporting event broadcast in Spain (e.g., providing different regional versions of the event by the same content distributor). In another example, content distributor A can broadcast one live-stream of sporting event X and content distributor B can broadcast another different live-stream of sporting event X. Each of the different live-stream media items of the same event can be sent to content delivery platform 114.

In some embodiments, content delivery platform 114 can perform a sampling operation 306. At sampling operation 306, content delivery platform 114 may sample the portions of a live-stream media item 120. In some embodiments, content delivery platform 114 can sample a subset of the frames of the received portions of the live-stream media item. In other embodiments, content delivery platform 114 can sample all the frames of the received portions of the live-stream media item.

In some embodiments, the frames of the (portions of) the live-stream media item can be sampled at a particular frequency. For example, the portions of the live-stream media item 120 can be sampled at a frequency of one frame per second. In some embodiments, the frequency can be changed according to the event type. In some embodiments, the sample frequency can correspond to the smallest increment of an event clock for a particular event type. For example, for event types that have an event clock that increments at 1 second, the frames of the portions of the live-stream media item can be sampled at one frame per second. For event types that have an event clock that is sub-second, the frames of the portions of the live-stream media item can be sampled at a sub-second frequency or all the frames of the live-stream media item can be used. For example, an American football event type can have an event clock that increments in seconds and the frames of the live-stream of the American football event type can be sampled at 1 frame per second. In another example, a 100 yard dash event type can have an event clock that increments in milliseconds. The frames of the live-stream of the 100 yard dash type can be sampled at a sub-second frequency.

In some embodiments, content delivery platform 114 can perform a content analysis operation 308 (e.g., text analysis) on the sampled video frames of the live-stream media item. In some embodiments, at content analysis operation 308 content delivery platform 114 can analyze the one or more sampled frames to retrieve frame content information describing the contents of the frame. In some embodiments, the frame content information can include text within an analyzed video frame or the location information of the text that is indicative of the location of the text with respect to the analyzed video frame.

In some embodiments, an optical character recognition technique can be used to retrieve the text and the location information of the text. It may be noted that optical character recognition techniques are used for purposes of illustration, rather than limitation. In other implementations, other techniques can be used for retrieving frame content information. In some embodiments, the optical character recognition operation can convert images of text into machine-encoded text. For example, an event clock image that is within a frame of the live-stream media item can be converted into text. In some embodiments, all text images within a frame can be converted into text.

In some embodiments, identifying the location information of the text may include identifying coordinate identifiers (e.g., four coordinate identifiers) that locate the text in a coordinate structure with respect to a given frame. For example, a coordinate structure, such as an X-axis and Y-axis, can be applied to each frame. The location of the text can be determined within the coordinate structure. The location of the text can be described by coordinate identifiers. In some embodiments, for each frame one or more of the text, location information, and a frame identifier that identifies the frame that corresponds to the text and location information can be sent to candidate event clock operation 312. In some embodiments, for frames with no text an indication that no text was found in the frame and frame identifier can be sent to candidate event clock operation 312.

In some embodiments, content delivery platform 114 can perform the candidate event clock operation 312. At the candidate event clock operation 312, content delivery platform 114 identifies one or more candidate event clocks within each or some of the one or more sampled frames using the text and location information provided by content analysis operation 308. In some embodiments, pattern recognition techniques can be used to identify candidate event clocks from the text and location information of the text. Pattern recognition can refer to checking a given sequence values, such as text and/or the location information of the text, for the presence some predetermined pattern.

For example, event clocks often correspond to a particular format. For instance, four numbers partitioned by a colon ("12:45") is a common format for event clocks. In some embodiments, the text and the location information of the text retrieved from the optical character recognition technique can be used as input and processed through a pattern recognition sub-operation to determine whether the text is to be considered a candidate event clock (or candidate event period). The pattern recognition sub-operation can determine if the text and text location information correspond (e.g. matches) to a particular pattern or format (e.g., event clock pattern) and filter out text and text location information that does not correspond to a pattern (e.g., noise). If the text and/or text location information matches or corresponds to a pattern, the text can be determined to be a candidate event clock. If the text does not match or correspond to a pattern, the text is not recognized as a candidate event clock.

In some embodiments, a particular pattern recognition operation can be selected from multiple pattern recognition operations based on the event type. Different event types can have different event clock patterns and period patterns. The selected pattern recognition operation can detect the particular patterns of a specific event type.

In some embodiments, the content delivery platform 114 can perform scoring operation 314 on the candidate event clocks identified at candidate event clock operation 312. The determined candidate event clocks and the respective text location information can be sent from the candidate event clock operation 312 to the scoring operation 314. The content delivery platform 114 performing the scoring operation 314 can generate a score for each of the one or more candidate event clocks in each of the one or more sampled frames.

In some embodiments, a particular scoring operation can be selected from multiple scoring operations based on the event type. Different event types can have different characteristics. For example, the event clock for a soccer event is expected to increase with respect to sequential frames, whereas the event clock for an American football event is expected to decrease. The selected scoring operation can score the candidate event clocks based on the specific characteristic of the particular event type.

In some embodiments, the score can be based on one or more criteria (or rules). As noted above, the criteria can be based on the event type. In an example, content delivery platform 114 can determine whether the time of one or more of the candidate event clocks has changed from one frame to the next sequential frame of the sampled video frames. Responsive to determining that the time of the candidate event clock has changed from one frame to the next sequential frame, the content delivery platform 114 can determine the magnitude and direction of the change. If the magnitude and the direction of the change is consistent with event clocks of the particular event type, content delivery platform 114 can score (e.g., frame score) the candidate event clock positively for the respective frame. If either the magnitude of the change or the direction of the change is not consistent with event clocks of the particular event type, content delivery platform 114 can score (e.g., frame score) the candidate event clock negatively for the respective frame.

For instance, a candidate event clock X is associated with text that reads "12:20" for frame one. For the next sequential sampled frame, frame 2, the candidate event clock X is associated with text that reads "12:19." The frames are sampled every second, and the particular event type has event clocks that count down by one second increments. Content delivery platform 114 may add five points to the candidate event clock frame score at frame 2 and store this data as a frame score associate with candidate event clock X at frame 2.

In some embodiments, the scores for the candidate event clocks can be aggregated with respect to sequential frames. For example, aggregate score (e.g., cumulative score) for the candidate event clock X at frame 2 can be an aggregate of the score of candidate event clock X of frame 1 (if any) and the score of candidate event clock X of frame 2. The score of candidate event clock X at frame 3 can aggregate the score of candidate event clock X of frame 1, frame 2 and frame 3.

The scores (frame and/or aggregate scores) for each of the candidate event clocks for each of the sampled frames can be send to condition analysis operation 316. Some aspects of scoring of candidate event clock are further described with respect to FIG. 4.

In some embodiments, at condition analysis operation 316 content delivery platform 114 can determine whether the candidate event clocks of each of the one or sampled frames satisfies one or more conditions. In some embodiments, at condition analysis operation 316, content delivery platform 114 determines whether any of the scores of the one or more candidate event clocks satisfy a threshold score. For example, satisfying a threshold score can include determining that the candidate event clock score (e.g., aggregate score) for a particular frame is greater than or equal to the threshold score. In embodiments, the score of the candidate event clock for a particular frame correspond to the aggregate score of the candidate event clock for the particular frame. In some embodiments, content delivery platform 114 determines whether any of the scores of the one or more candidate event clocks of a particular frame satisfy the threshold score.

For example, at frame 3 there are three candidate event clocks: candidate event clock X, candidate event clock Y, and candidate event clock Z with aggregate scores 15, 10, and −5, respectively. The threshold score is 5. The scores of candidate event clock X (15) and candidate event clock Y (10) both satisfy the threshold score, and candidate event clock Z does not satisfy the threshold score.

In some embodiments, if any of the candidate event clocks have aggregate scores for a particular frame that satisfy a threshold score, those candidate event clock(s) can be evaluated in view of another condition (e.g., a second condition). In some embodiments, for the one or more candidate event clock having aggregate scores that satisfy a threshold score, content delivery platform 114 can select the candidate event clock having the highest score.

For example, candidate event clock X (15) and candidate event clock Y (10) of frame 3 both satisfied the threshold score. Candidate event clock X has the highest aggregate score, 15, as compared to the aggregate score (10) of candidate event clock Y.

In some embodiments, the candidate event clock with the highest score can be evaluated to determine if the candidate event clock satisfies another condition (e.g., third condition). In some embodiments, the third condition determines whether the candidate event clock is presented within a respective frame of one or more frames.

For example, candidate event clock X is the selected candidate event clock for frame 3 since it satisfied the threshold score and has the highest aggregate score for frame 3. Since the aggregate scores for a particular candidate event clock can be aggregated, some frames that do not have the candidate event clock within the current frame can still have an aggregate score for a candidate event clock that was present in previous frames. One example of frames that do not have a candidate event clock can include commercials that are inserted into the live-stream media item of the event. The aggregate score of a candidate event clock can be kept from the previous frames that included in the candidate event clock, and populated to subsequent frames that do not include the candidate event clock.

In embodiments, if a candidate event clock satisfies the one or more conditions the candidate event clock is identified as the actual event clock. If the candidate event clock does not satisfy the one or more conditions, the candidate event clock is not identified as the actual event clock.

In the above example, if candidate event clock X of frame 3 is not within frame 3, candidate event clock X is not identified as the actual event clock for frame 3. If the candidate event clock X of frame 3 is within the frame 3 (and meets the other conditions), candidate event clock X is identified as the actual event clock.

In some embodiments, one or more of the above conditions can be used to determine the actual event clock. In other embodiments, different conditions can be used to determine the actual event clock.

In some embodiments, content delivery platform 114 can perform mapping operation 318. At mapping operation 318, content delivery platform 114 can generate mapping data that maps the actual event clock to a timestamp associated with a respective frame of the one or more frames of the live-stream media item. As noted the actual event clock can be used as a reference or reference point for multiple live-stream media item of the same event. In some embodiments, the mapping data can be stored in a record. In an example, the mapping data can identify one or more the actual event clock (e.g., time of the actual event clock), the timestamp of the frame of the live-stream media item in which the actual event clock has been identified, and an identifier of the live-stream media item.

In some embodiments, content delivery platform 114 can perform annotation content generation operation 310. As noted with respect to FIG. 1, annotation content generation operation can be performed by a service (e.g., annotation service), such as a third-party service. In some embodiments, annotation content generation server 108 of FIG. 1 can perform annotation content generation operation 310.

In some embodiments, the annotation content generation operation 310 can receive the portions of the live-stream media item (e.g., not sampled) that are received by the content delivery platform 114. In some embodiments, the annotation content generation operation 310 can receive sampled frames of the live-stream media item. In some embodiments, annotation content generation operation 310 can provide annotation information to content delivery platform 114, where the annotation information is used by content delivery platform 114 to generate the annotation content. In some embodiments, at the annotation content generation operation 310, annotation content is generated or identified within the received frames of the live-stream media item. In some embodiments, the annotation content can be sent along with a range of timestamps at which the annotation content can be found within the live-stream media item. In some embodiments, the annotation content can be sent along with a range of timestamps that indicate times of the live-stream media item at which the annotation content is relevant. The timestamps can be used with the mapping data to identify that actual event clock of the event at which the annotation content is relevant.

In an example, at annotation content generation operation 310, content delivery platform 114 can analyze the live-stream media item to identify a relevant segment (e.g., key play) of the live-stream media item of an American football sporting event, such as a scoring segment (e.g., a play resulting in a score or touchdown). At the annotation content generation operation 310, the sampled frame or a sequence of sampled frames (e.g., timestamp(s)) that contain the relevant segment can be identified. The generated annotations content and/or annotation information can be sent to annotation of live-stream media item operation 322. In some embodiments, content delivery platform 114 can perform an annotation content discovery operation 320. In some embodiments, at the annotation content discovery operation 320 content delivery platform 114 can use the actual event clock (or timestamps received from annotation content generation operation 310) to identify relevant content, such as event information, that can be used to generate annotation content or modify annotation content received from annotation content generation operation 310. In some embodiments, content delivery platform 114 can query the data store 109 to identify event information pertaining to the time of the actual event clock. In some embodiments, the time of the event clock to which the event information pertains can be mapped to timestamp(s) of a live-stream media item using the mapping data, such that annotation content generated from the event information can be presented along with the live-stream media item at the appropriate time.

For example, data store 109 may store live statistics of the event that correspond to a certain time of the event clock of the event. For instance, during a basketball sporting event, player A might have twenty points at event time 11:15. The data store 109 may be queried to retrieve the event information and use the event information to generate annotation content. For instance, content delivery platform 114 can annotate the live-stream media item (e.g., generate an overlay) that displays the event information with the presentation of the live-stream media item.

In some embodiments, content delivery platform 114 can perform annotation of live-stream media item operation 322. At annotation of live-stream media item operation 322, content delivery platform 114 can apply annotation content the one or more live-stream media items.

In some embodiments, the annotation content from annotation content generation operation 310 can be sent to annotation of live-stream media item operation 322 with corresponding timestamp(s) of the live-stream media item at which the annotation content is relevant. The annotation content can be mapped to an actual game clock (e.g., time(s) of an actual game clock) using the mapping data.

In some embodiments, multiple live-stream media items of the same event can be processed such that mapping data for the multiple live-stream media items is generated. In some embodiments, a single live-stream media item of the multiple live-stream media items of the same event is processed at annotation content generation operation 310. The timestamps identified at annotation content generation operation 310 can be used to identify the actual event clock (e.g., reference point) for multiple live-stream media items of the same event. For instance, the identified actual event clock can be used with the mapping data to identify corresponding timestamps of the other live-stream media items of the multiple live-stream media items at which the annotation content is relevant. In some embodiments, the annotation content can be applied the other live-stream media item at the corresponding timestamps without performing the annotation content generation operation 310 on the other live-stream media item.

In some embodiments, content delivery platform 114 can apply the event information (or annotation content generated from the event information) received from annotation content discovery operation 320 to one or more live-stream media items of the event. In some embodiments, the event information of annotation content discovery operation 320 or annotation content generated from the event information can be used with supplement or modify the annotation content received from annotation content generation operation 310. In some embodiments, the event information of annotation content discovery operation 320 or annotation content generated from the event information can be used for annotation content that is separate from the annotation content generated at annotation content generation operation 310. In some embodiments, the event information (or annotation content generated from the event information) received from annotation content discovery operation 320 includes the corresponding event clock. The mapping data and the corresponding event clock information can be used to identify the corresponding timestamps of the multiple live-stream media item(s) at which the event information or annotation content generated from the event information can be applied.

In some embodiments, content delivery platform 114 can transmit the annotated live-stream media item(s) to one or more client devices 103A-103Z for presentation of the live-stream media item along with the annotation content. As noted above, the live-stream media item received by the content delivery platform 114 from content distribution server 107 can be buffered for a short period of time. The operations as described with respect to pipeline 300 can be performed during the buffer period, and the annotated live-stream media item can be provided to client device 103A-103Z with minimal delay.

Figure 3B:
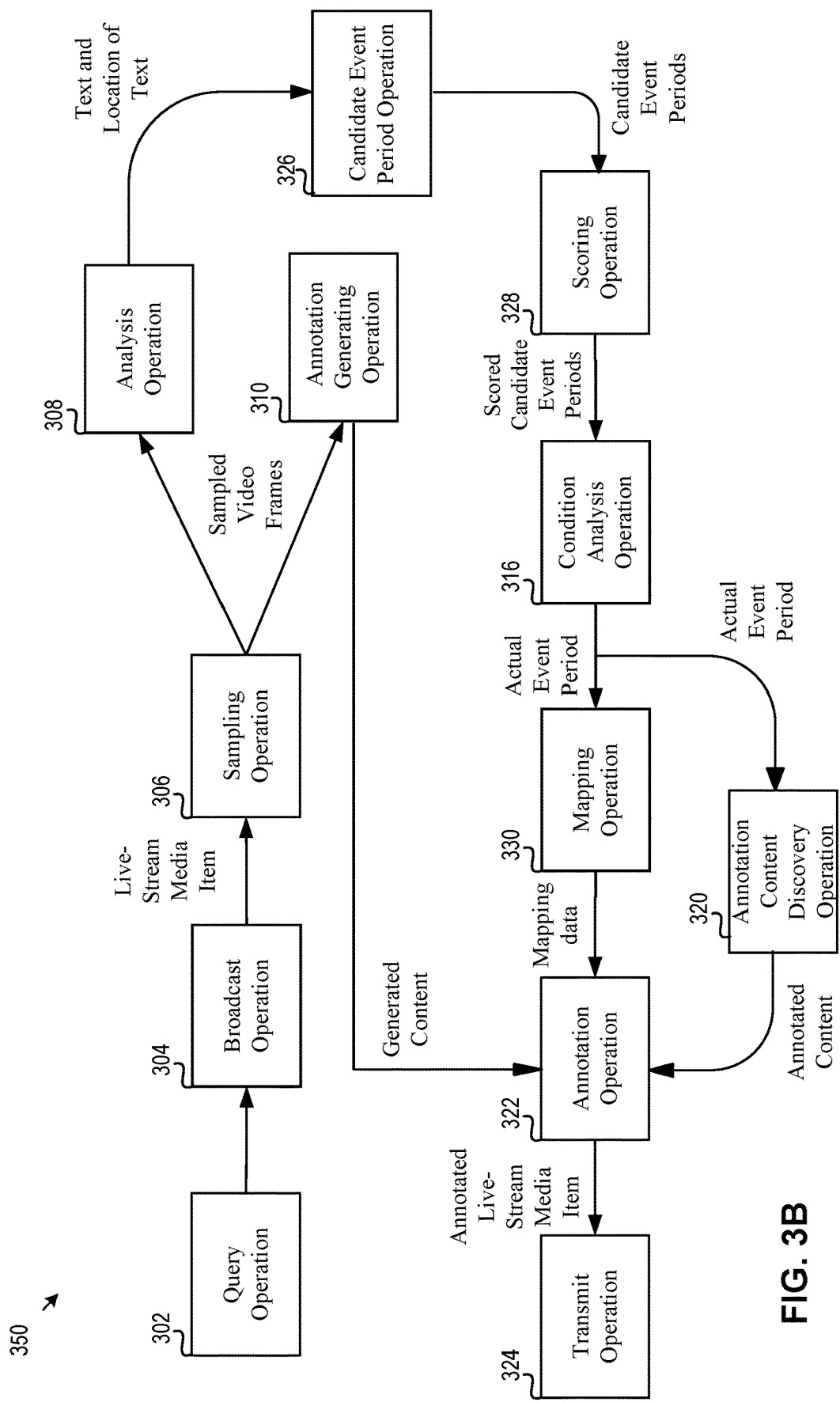
FIG. 3B is an example pipeline of operations for mapping an actual event period to a timestamp associated with a frame of the live-stream media item, in accordance with embodiments of the disclosure.

FIG. 3B is an example pipeline of operations for mapping an actual event period to a timestamp associated with a frame of the live-stream media item, in accordance with embodiments of the disclosure. One or more of the operations of pipeline 350 can be performed by mapping module 110. Although the pipeline 350 is illustrated with a particular order, it can be appreciated that some of the operations can performed serially or in parallel. It can also be noted that the same, fewer, greater, or different operations can be performed in some embodiments. It can be noted that the operations of pipeline 350 can be similar to operations of pipeline 300 of FIG. 3A. In embodiments, the operations of pipeline 300 of FIG. 3A apply to operations of to FIG. 3B, unless otherwise described, and are not repeated for the sake of clarity.

In some embodiments, content delivery platform 114 can perform candidate event period operation 326. In some embodiments, at the candidate event period operation 326 content delivery platform 114 identifies one or more candidate event periods within one or more of the sampled frames. In some embodiments, pattern recognition can be used to identify candidate event periods from the text recognized from within the sampled one or more frames. For example, event periods can correspond to a particular pattern. For instance, the word "Quarter" (or the abbreviation thereof) followed by a colon and subsequently, a number (Quarter: 1) can be a pattern for event periods. In some embodiments, the text and the location information of the text retrieved from the content analysis operation 308 can be used as input to a pattern recognition sub-operation of the candidate event period operation 326. A particular pattern recognition sub-operation can be selected from multiple pattern recognition sub-operations based on the event type of the live-stream media item. The pattern recognition sub-operation can determine if the text (and/or location information of the text) corresponds a particular pattern (e.g., event period pattern) and filter out text and text location information that do not correspond to a particular pattern (e.g., noise). In some embodiments, responsive to determining that the text (and/or text location information) correspond to a particular pattern, the text can be identified as a candidate event period.

In some embodiments, content delivery platform 114 can perform a scoring operation 328. The determined candidate event periods and the respective location information can be sent from the candidate event period operation 326 to the scoring operation 328. The content delivery platform 114 performing the scoring operation 328 can generate a score for each of the one or more candidate event periods in each of the one or more sampled frames.

In some embodiments, a particular scoring operation can be selected from multiple scoring operations based on the event type. Different event types can have different characteristics. For example, the event period for a soccer event can be divided into a 1st half and a 2nd half, whereas the event period for an American football event can be divided into 4 quarters. The selected scoring operation can score the candidate event periods based on the specific characteristic of the particular event type.

In some embodiments, the scoring can be based on one or more criteria (e.g., rules). As noted above, the criteria can be based on the event type. In an example, content delivery platform 114 can determine whether one or more of the candidate event periods have changed from one frame to the next sequential frame of the sampled video frames. Responsive to determining that the candidate event period has changed from one frame to the next sequential frame, the content delivery platform 114 can determine the magnitude and direction of the change. If the magnitude of the change and the direction of the change is consistent with event periods of the particular event type, content delivery platform 114 can score (e.g., frame score) the candidate event period positively. If either the magnitude of the change or the direction of the change is not consistent with event periods of the particular event type, content delivery platform 114 can score (e.g., frame score) the candidate event period negatively. For example, candidate event period X is associated with text that reads "Quarter: 2" for frame one. For the next sequential frame, frame two, candidate event period X is associated with text that reads "Quarter: 3". For an event type that has 4 quarters, the change from "Quarter: 2" to "Quarter: 3" can be determined to correspond to an event period pattern and frame two can be scored positively (e.g., frame score).

In some embodiments the candidate event period scores can be aggregated with respect to sequential frames. For example, the aggregate score for candidate event period X at frame 2 can be the aggregate of the score of candidate event period A at frame 1 and frame 2.

In some embodiments, content delivery platform 114 can perform mapping operation 330. At mapping operation 330, content delivery platform 114 can generate mapping data that maps the actual event period to a timestamp associated with a respective frame of the one or more frames of the live-stream media item. As noted the actual event period can be used as a reference or reference point for multiple live-stream media items of the same event. In some embodiments, the mapping data can be stored in a record. In an example, the mapping data can identify one or more the actual event periods, the timestamp of the live-stream media item at which the actual event period has been identified within a corresponding frame, and an identifier of the live-stream media item.

In some embodiments, the mapping data generated by the mapping operation 330 can be combined with the mapping data generated at mapping operation 318 in FIG. 3A. For example, the actual event clock can read "10:45" and the event period reads "Quarter: 3." The mapping data can associate the actual event clock, the actual event period, the timestamp of the live-stream media item at which the actual even clock and the actual event period have been identified within a corresponding frame, and an identifier of the live-stream media item.

Figure 4:
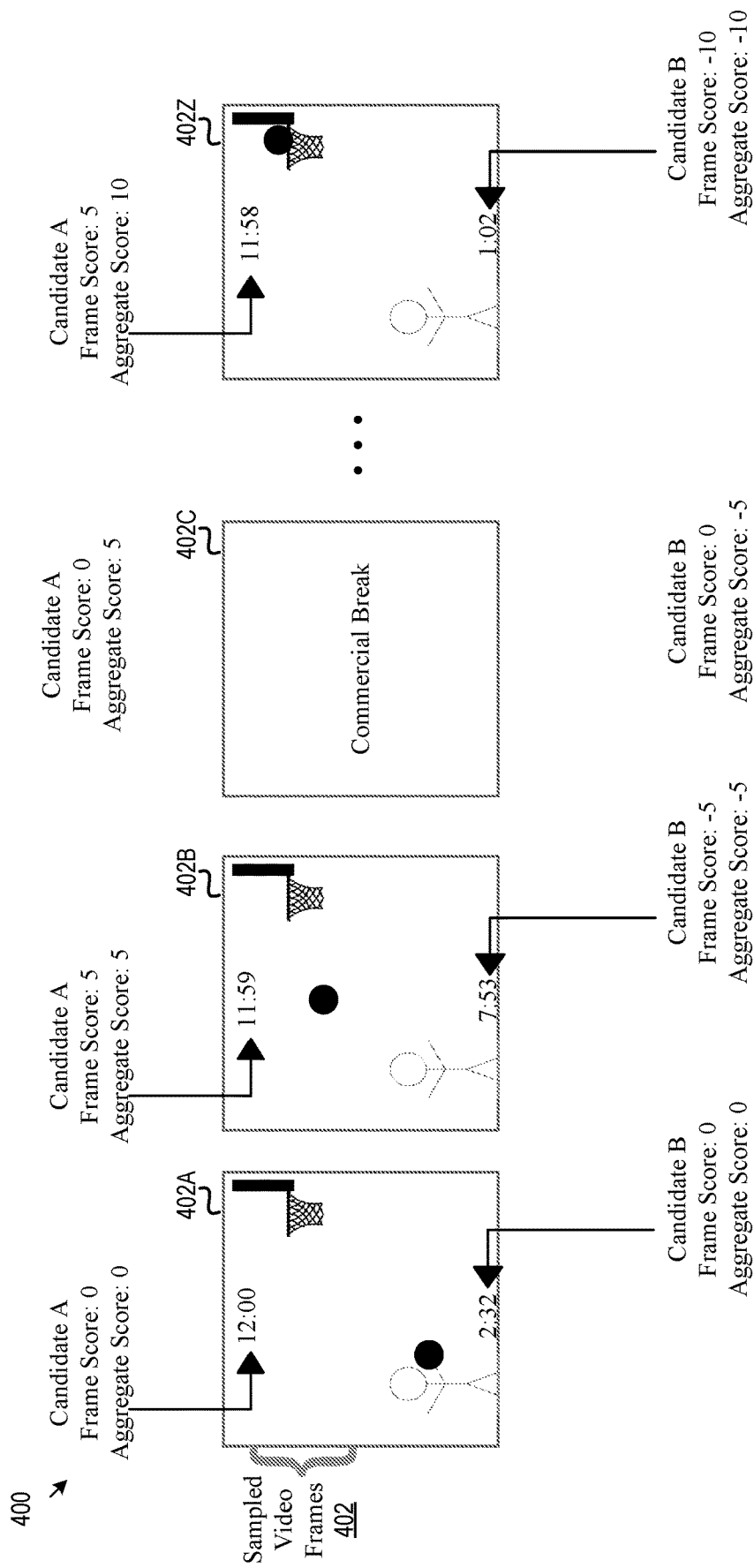
FIG. 4 is an example block diagram illustrating a scoring operation to generate scores for candidate event clocks, in accordance with embodiments of the disclosure.

FIG. 4 is an example block diagram 400 illustrating a scoring operation to generate scores (e.g., frame scores and aggregate scores) for candidate event clocks, in accordance with embodiments of the disclosure. In some embodiments, the scoring operation of diagram 400 may be similar to scoring operation 314 as described with respect to FIG. 3A. For the sake of clarity, the scoring operation for candidate event clock is described with respect to FIG. 4. If can be understood that the scoring operation of diagram 400 can apply to the scoring of candidate event periods.

Diagram 400 illustrates sampled frames 402A-402Z (generally referred to as frames 402). It should be noted that sampled frames 402 may include the same, more, or fewer video frames. In some embodiments, sampled video frames 402 may be ordered based on a timestamp associated with each sampled frame 402. Some of the sampled frames 402 are shown with candidate event clocks. Each candidate event clock is associated with a corresponding frame score and a corresponding aggregate score.

For example, candidate event clock A in sampled frame 402A has a frame score of zero and an aggregate score of zero. In sampled frame 402B, candidate event clock A has a frame score of five and an aggregate score of five. It may be noted that the numbers, sizes, equations below are used for purposes of illustration, rather than limitation.

As shown in the diagram 400, some of the sampled frames 402 include two candidate event clocks: candidate event clock A and candidate event clock B. Both candidate event clocks are illustrated with a corresponding frame score and a corresponding aggregate score. The scoring operation generates a frame score for each candidate event clock based on one or more criteria, as described in FIG. 3A. The selected one or more criteria can be based on the particular event type. In diagram 400, the event type is a basketball event type and the corresponding one or more criteria used for scoring can be for a basketball event type.

In one example, criteria includes analyzing the changes in the candidate event clock with respect to sequentially sampled frames. Frame 402A, is the initial frame where candidate event clock A and candidate event clock B are first identified. The frame score for each of the candidate event clock A and B is initialized at 0, and the cumulative score is also initialized at 0. From frame 402A to frame 402B, candidate event clock A changes from "12:00" to "11:59" while candidate event clock B changes "2:32" to "7:53." As noted above, the event type in diagram 400 is a basketball event type and the event clock is expected to decrease for sequentially sampled frames by 1 second if the frames are sampled at 1 frame per second. At frame 401B, the scoring operation assigns a positive frame score to candidate event clock A since candidate event clock A decreases from frame 402A to frame 402B by 1 second (e.g., according to the criteria). At frame 402B, the aggregate score for candidate event clock A is 5. At frame 402B, the scoring operation assigns a negative frame score to candidate event clock B since candidate event clock B increases from frame 402A to frame 402B, which does not satisfy the criterion. At frame 402B, the aggregate score for candidate event clock B is −5.

In some embodiments, the scoring criteria can include whether the candidate event clock scores are present with respect to sequentially sampled frames. One instance in which no candidate event clocks are presented within a frame is during a commercial break.

At frame 402C, a commercial break is represented and the presentation of the basketball event is temporarily paused. As illustrated, candidate event clock A and candidate event clock B are not present within frame 402C. Since both candidate event clock A and candidate event clock C are not present in frame 402C, no frame score is assigned to candidate event clock A and candidate event clock B at frame 402C. The aggregate scores for candidate event clock A and candidate event clock B are passed along and unchanged for the duration of the commercial break. It can be noted that frames 402D through 402Y represent frames of the commercial, and are omitted for purposes of clarity.

From frame 402B to frame 402Z, candidate event clock A changes from "11:59" to "11:58" while candidate event clock B changes from "7:53" to "1:02." Candidate event clock A and candidate event clock B of frame 402Z are compared to the respective candidate event clock of frame 402B, rather than the immediately previous sampled frame, because frame 402B is the most recent frame in which candidate event clock A and candidate event clock were present. At frame 420Z, the scoring operation assigns a positive frame score to candidate event clock A since candidate event clock A decreases from frame 402B to frame 402Z by 1 second (e.g., according to the criteria for the event type). At frame 420Z, the frame score for candidate event clock A is 5 and the aggregate score for candidate event clock A is 10. At frame 420Z, the scoring operation assigns a negative frame score to candidate event clock B since candidate event clock B increases from frame 402B to frame 402Z, which does not satisfy the criteria for the event type. At frame 420Z, the frame score for candidate event clock B is −5 and the aggregate score for candidate event clock B is −10.

Figure 5:
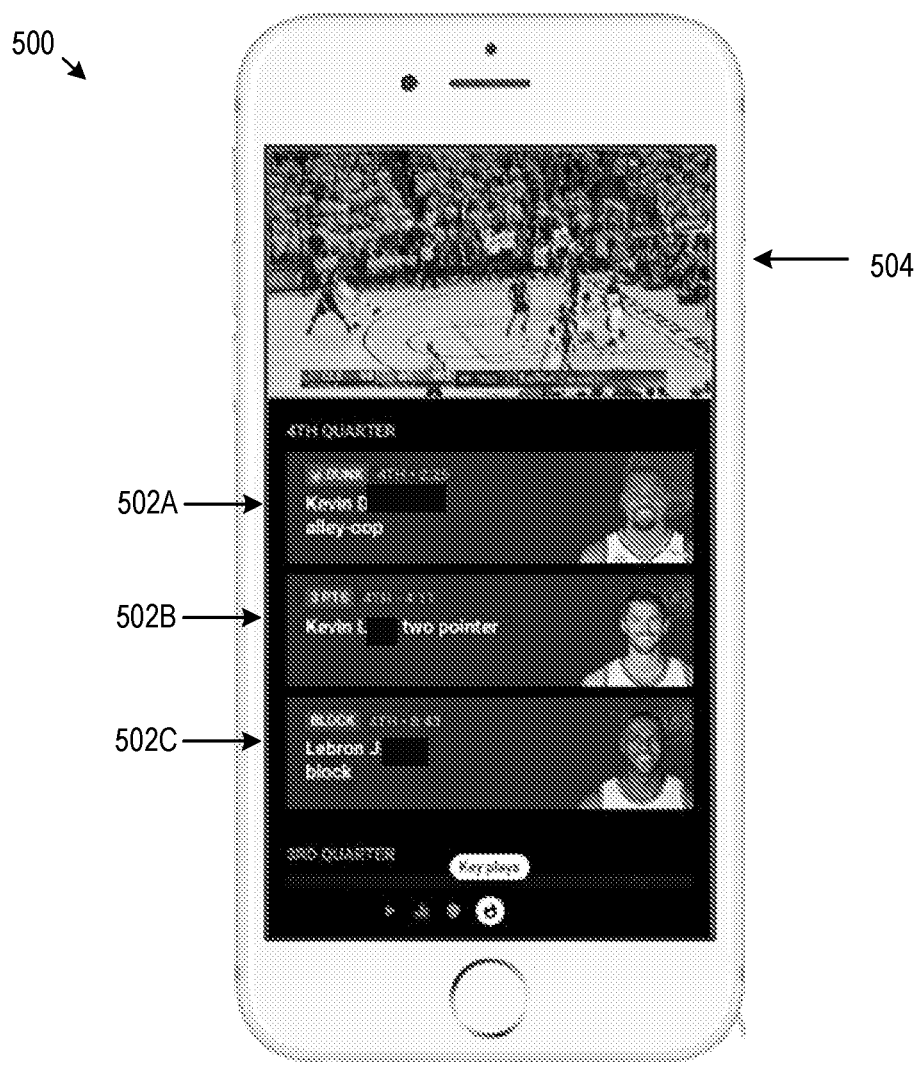
FIG. 5 illustrates an example of a presentation of live-stream media item with annotation content at a client device, in accordance with embodiments of the disclosure.

FIG. 5 illustrates an example of a presentation of live-stream media item with annotation content at a client device, in accordance with embodiments of the disclosure.

Graphical user interface (GUI) 500 of the client device shows the presentation of live-stream media item 504. Live-stream media item 504 is a basketball event type. Below live-stream media item 504 is annotation content 502A, 502B, and 502C (generally referred to as "annotation content 502").

Annotation content 502 are examples of relevant segments of the live-stream media item. For example, annotation content 502A corresponds to the relevant segment in which basketball player Kevin D receives an alley-oop in the $4^{th}$ quarter (e.g., event period) at an event clock of 2:25. As illustrated, annotation content 502B corresponds to the relevant segment in which basketball player Kevin L scores a two-point basket. Annotation content 502C corresponds to the relevant segment in which basketball player Lebron J blocks a shot.

The relevant segment can be an example of annotation content identified by annotation content generation server 108 of FIG. 1 or annotation content generation operation 310 of FIG. 3A. For example, annotation content 502A-502C can be selected to display a video of the relevant segment at GUI 500.

Some of the content in annotation content 502A can be an example of annotation information identified from data store 109 of FIG. 1 or annotation content discovery operation 320 of FIG. 3A. For example, the name of the player, the type of play, and the picture of the player can be examples of annotation information that has been identified at data store 109. The annotation information from data store 109 has been added to the annotation content from annotation content generation server 108 to generate annotation content 502.

The annotation content 502 is provided as illustration rather than limitation. In other embodiments, the annotation content can be different or presented differently. For example, annotation content can be added directly to the live-stream media item so as to be displayed at particular frames. In some embodiments, the annotation content can be presented in the media viewer with the live-stream media item. In some embodiments, the annotation can be overlaid on the live-stream media item in the media view.

Figure 6:
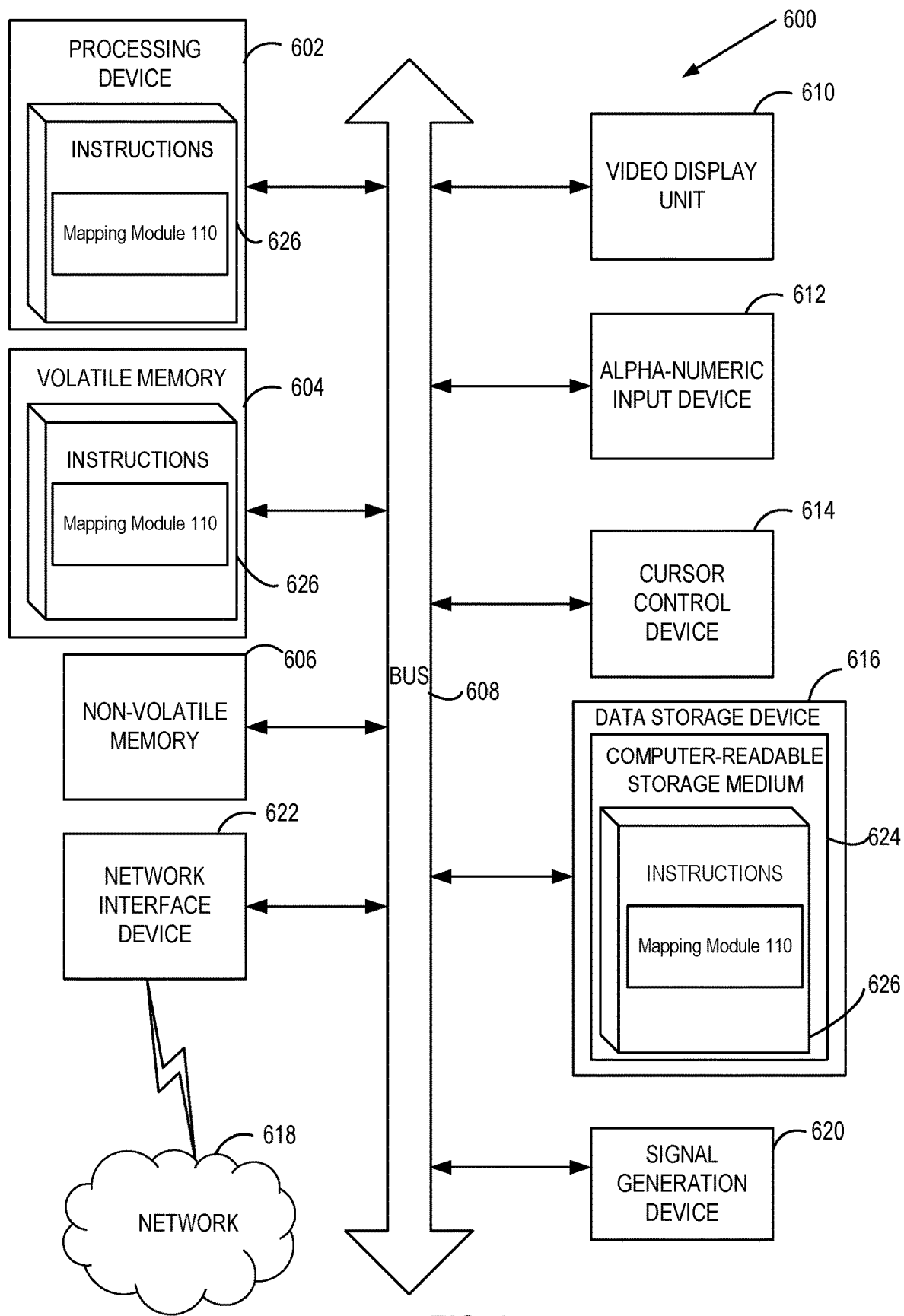
FIG. 6 is a block diagram illustrating an exemplary computer system, in accordance with an embodiment of the disclosure.

FIG. 6 is a block diagram illustrating an exemplary computer system 600, in accordance with an embodiment of the disclosure. The computer system 600 executes one or more sets of instructions that cause the machine to perform any one or more of the methodologies discussed herein. Set of instructions, instructions, and the like may refer to instructions that, when executed computer system 600, cause computer system 600 to perform one or more operations of mapping module 110. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions of the system architecture 100 and mapping module 110 for performing the operations discussed herein.

The computer system 600 may further include a network interface device 622 that provides communication with other machines over a network 618, such as a local area network (LAN), an intranet, an extranet, or the Internet. The computer system 600 also may include a display device 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored the sets of instructions of the system architecture 100 or of mapping module 110 embodying any one or more of the methodologies or functions described herein. The sets of instructions of the system architecture 100 or of mapping module 110 may also reside, completely or at least partially, within the main memory 604 and/or within the processing device 602 during execution thereof by the computer system 600, the main memory 604 and the processing device 602 also constituting computer-readable storage media. The sets of instructions may further be transmitted or received over the network 618 via the network interface device 622.

While the example of the computer-readable storage medium 624 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating", "analyzing," "determining," "identifying," "providing," "annotating," "determining," "selecting," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method comprising:
   receiving one or more frames sampled from a first media item of an event that is concurrently being streamed to one or more users of a content delivery platform;
   analyzing, by a processing device, the one or more frames to identify one or more candidate event clocks within the one or more frames;
   for each of the one or more frames,
     determining whether a candidate event clock of the one or more candidate event clocks satisfies one or more conditions;
     responsive to determining that the candidate event clock of the one or more candidate event clocks satisfies the one or more conditions, identifying the candidate event clock as an actual event clock used to time the event, and generating mapping data that maps the actual event clock to a timestamp associated with a respective frame of the one or more frames of the first media item; and generating additional mapping data that maps the actual event clock of the event to a timestamp associated with a respective frame of one or more frames of a second media item.

2. The method of claim 1, further comprising:

identifying annotation content that is relevant to the first media item;

annotating the first media item with the annotation content based on the mapping data; and providing the first media item with the annotation content for presentation at a client device.

3. The method of claim 1, wherein determining whether the candidate event clock of the one or more candidate event clocks satisfies the one or more conditions comprises:

for each of the one or more frames, generating a score for each of the one or more candidate event clocks indicating a likelihood that a respective candidate event clock of the one or more candidate event clocks is the actual event clock used to time the event; and determining whether any of the scores for the one or more candidate event clocks satisfies a threshold score.

4. The method of claim 3, wherein determining whether the candidate event clock of the one or more candidate event clocks satisfies the one or more conditions further comprises:

responsive to determining that more than one of the scores for the one or more candidate event clocks satisfies the threshold score, selecting a candidate event clock having a highest score.

5. The method of claim 4, wherein determining whether the candidate event clock of the one or more candidate event clocks satisfies the one or more conditions further comprises:

determining whether the candidate event clock having the highest score is presented within a respective one of the one or more frames.

6. The method of claim 1, further comprising:

causing an annotation content analysis of the first media item as the first media item is concurrently being streamed to the one or more users, the annotation content analysis to identify annotation content that is relevant to the first media item at a particular timestamp associated the first media item;

identifying the actual event clock of the event using the timestamp associated with the first media item and the mapping data; and providing the annotation content to a client device for presentation with an instance of the first media item.

7. The method of claim 6, wherein the client device is a first client device, the method further comprising:

annotating the second media item with the annotation content based on the actual event clock and the additional mapping data; and providing the second media item with the annotation content for presentation at a second client device.

8. The method of claim 7, wherein the annotation content analysis of the second media item is not performed, and wherein the timestamp associated with the first media item and that corresponds to a particular time of the actual event clock of the event is different than a timestamp associated with the second media item and that corresponds to a same particular time of the actual event clock of the event.

9. The method of claim 1, comprising:

analyzing the one or more frames to identify one or more candidate event periods within the one or more frames; or each of the one or more frames, determining whether a candidate event period of the one or more candidate event periods satisfies one or more conditions; and responsive to determining that the candidate event period of the one or more candidate event periods satisfies the one or more conditions, identifying the candidate event period as an actual event period used to divide a time of the event, and generating mapping data that maps the actual event period to a timestamp associated with a respective frame of the one or more frames of the first media item.

10. The method of claim 1, wherein analyzing the one or more frames to identify the one or more candidate event clocks within the one or more frames comprises:

performing an optical character recognition operation on the one or more frames to identify i) text indicative of the one or more candidate event clocks and ii) location information that describes locations of the one or more candidate event clocks with respect to the one or more frames.

11. A system comprising:

a memory; and a processing device, coupled to the memory, to:

receive one or more frames sampled from a first media item of an event that is concurrently being streamed to one or more users of a content delivery platform;

analyze the one or more frames to identify one or more candidate event clocks within the one or more frames;

for each of the one or more frames, determine whether a candidate event clock of the one or more candidate event clocks satisfies one or more conditions;

responsive to determining that the candidate event clock of the one or more candidate event clocks satisfies the one or more conditions, identify the candidate event clock as an actual event clock used to time the event, and generate mapping data that maps the actual event clock to a timestamp associated with a respective frame of the one or more frames of the first media item; and generate additional mapping data that maps the actual event clock of the event to a timestamp associated with a respective frame of one or more frames of a second media item.

12. The system of claim 11, the processing device further to:

identify annotation content that is relevant to the first media item;

annotate the first media item with the annotation content based on the mapping data; and provide the first media item with the annotation content for presentation at a client device.

13. The system of claim 11, wherein to determine whether the candidate event clock of the one or more candidate event clocks satisfies the one or more conditions, the processing device to:

for each of the one or more frames, generate a score for each of the one or more candidate event clocks indicating a likelihood that a respective candidate event clock of the one or more candidate event clocks is the actual event clock used to time the event; and determine whether any of the scores for the one or more candidate event clocks satisfies a threshold score.

14. The system of claim 13, wherein to determine whether the candidate event clock of the one or more candidate event clocks satisfies the one or more conditions, the processing device further to:

responsive to determining that more than one of the scores for the one or more candidate event clocks satisfies the threshold score, select a candidate event clock having a highest score.

15. The system of claim 14, wherein to determine whether the candidate event clock of the one or more candidate event clocks satisfies the one or more conditions, the processing device further to:

determine whether the candidate event clock having the highest score is presented within a respective one of the one or more frames.

16. The system of claim 11, the processing device to:

analyze the one or more frames to identify one or more candidate event periods within the one or more frames;

for each of the one or more frames, determine whether a candidate event period of the one or more candidate event periods satisfies one or more conditions; and responsive to determining that the candidate event period of the one or more candidate event periods satisfies the one or more conditions, identify the candidate event period as an actual event period used to divide a time of the event, and generating mapping data that maps the actual event period to a timestamp associated with a respective frame of the one or more frames of the first media item.

17. A non-transitory computer-readable medium comprising instruction that, responsive to execution by a processing device, cause the processing device to perform operations comprising:

receiving one or more frames sampled from a first media item of an event that is concurrently being streamed to one or more users of a content delivery platform;

analyzing, by the processing device, the one or more frames to identify one or more candidate event clocks within the one or more frames;

for each of the one or more frames, determining whether a candidate event clock of the one or more candidate event clocks satisfies one or more conditions;

responsive to determining that the candidate event clock of the one or more candidate event clocks satisfies the one or more conditions, identifying the candidate event clock as an actual event clock used to time the event, and generating mapping data that maps the actual event clock to a timestamp associated with a respective frame of the one or more frames of the first media item; and generating additional mapping data that maps the actual event clock of the event to a timestamp associated with a respective frame of one or more frames of a second media item.

18. The non-transitory computer-readable medium of claim 17, further comprising:

identifying annotation content that is relevant to the first media item;

annotating the first media item with the annotation content based on the mapping data; and providing the first media item with the annotation content for presentation at a client device.

19. The non-transitory computer-readable medium of claim 17, further comprising:

causing an annotation content analysis of the first media item as the first media item is concurrently being streamed to the one or more users, the annotation content analysis to identify annotation content that is relevant to the first media item at a particular timestamp associated the first media item;

identifying the actual event clock of the event using the timestamp associated with the first media item and the mapping data; and providing the annotation content to a client device for presentation with an instance of the first media item.

20. The non-transitory computer-readable medium of claim 19, wherein the client device is a first client device, the operations further comprising:

annotating the second media item with the annotation content based on the actual event clock and the additional mapping data; and providing the second media item with the annotation content for presentation at a second client device.

* * * * *